United States Patent [19]

F'Geppert

[11] 4,383,697

[45] May 17, 1983

[54] REVERSIBLE KINGPIN FOR TRAILERS

[75] Inventor: Erwin F'Geppert, Oakland, Mich.

[73] Assignee: The United States of America as represented by the Secretary of the Army, Washington, D.C.

[21] Appl. No.: 241,292

[22] Filed: Mar. 6, 1981

[51] Int. Cl.³ .............................................. B62D 53/08
[52] U.S. Cl. ................................ 280/415 A; 280/433
[58] Field of Search ............... 280/433, 415 R, 415 A, 280/415 B, 438 R, 425 R, 490 R, 490 A, 407, 417

[56] References Cited

U.S. PATENT DOCUMENTS

| 1,990,328 | 2/1935 | Jett | 280/490 R |
| 2,515,575 | 7/1950 | Van Langen | 280/425 R |
| 2,590,962 | 4/1952 | Gurton et al. | 280/425 R |
| 2,872,213 | 2/1959 | Hosford | 280/415 A |
| 3,330,574 | 7/1967 | Kulyk | 280/438 R |
| 3,801,134 | 4/1974 | Dees | 280/415 A |
| 3,899,194 | 8/1975 | Breford | 280/438 R |
| 4,050,707 | 9/1977 | Glumac | 280/438 R |

Primary Examiner—John A. Pekar
Attorney, Agent, or Firm—Peter A. Taucher; John E. McRae; Nathan Edelberg

[57] ABSTRACT

A novel adjustable skid plate assembly which permits any trailer so equipped to be towed by any sufficiently-powered draft vehicle having a different lower fifth wheel height than the trailer. By rotation of the entire skid plate assembly different skid plates are presented for use with the draft vehicle. A latch means or counter weight means is provided to eliminate unwanted rotation of the assembly.

9 Claims, 7 Drawing Figures

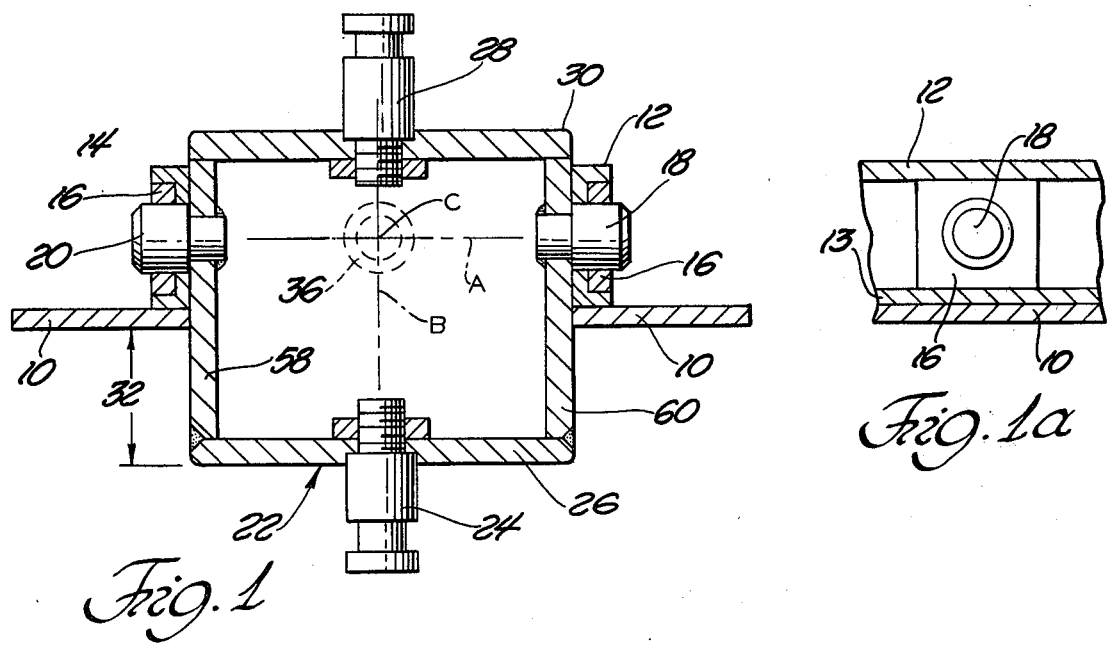
Fig. 1
Fig. 1a
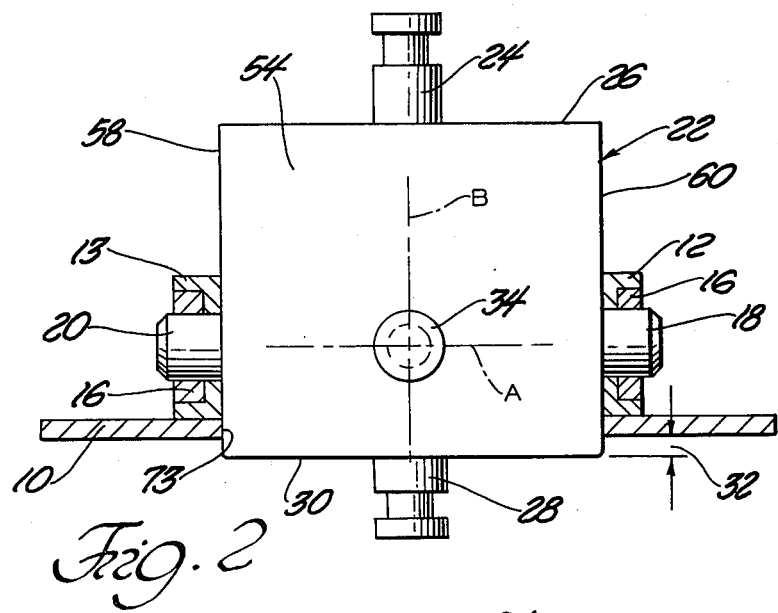
Fig. 2
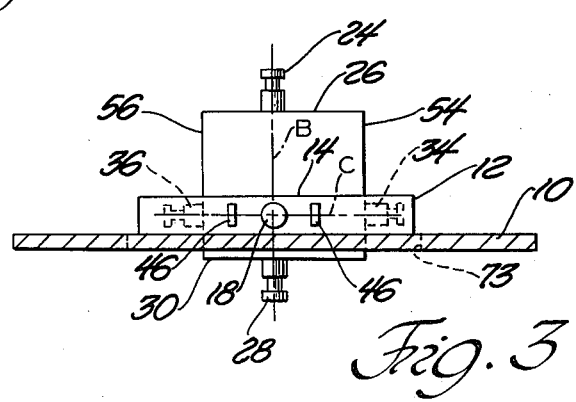
Fig. 3

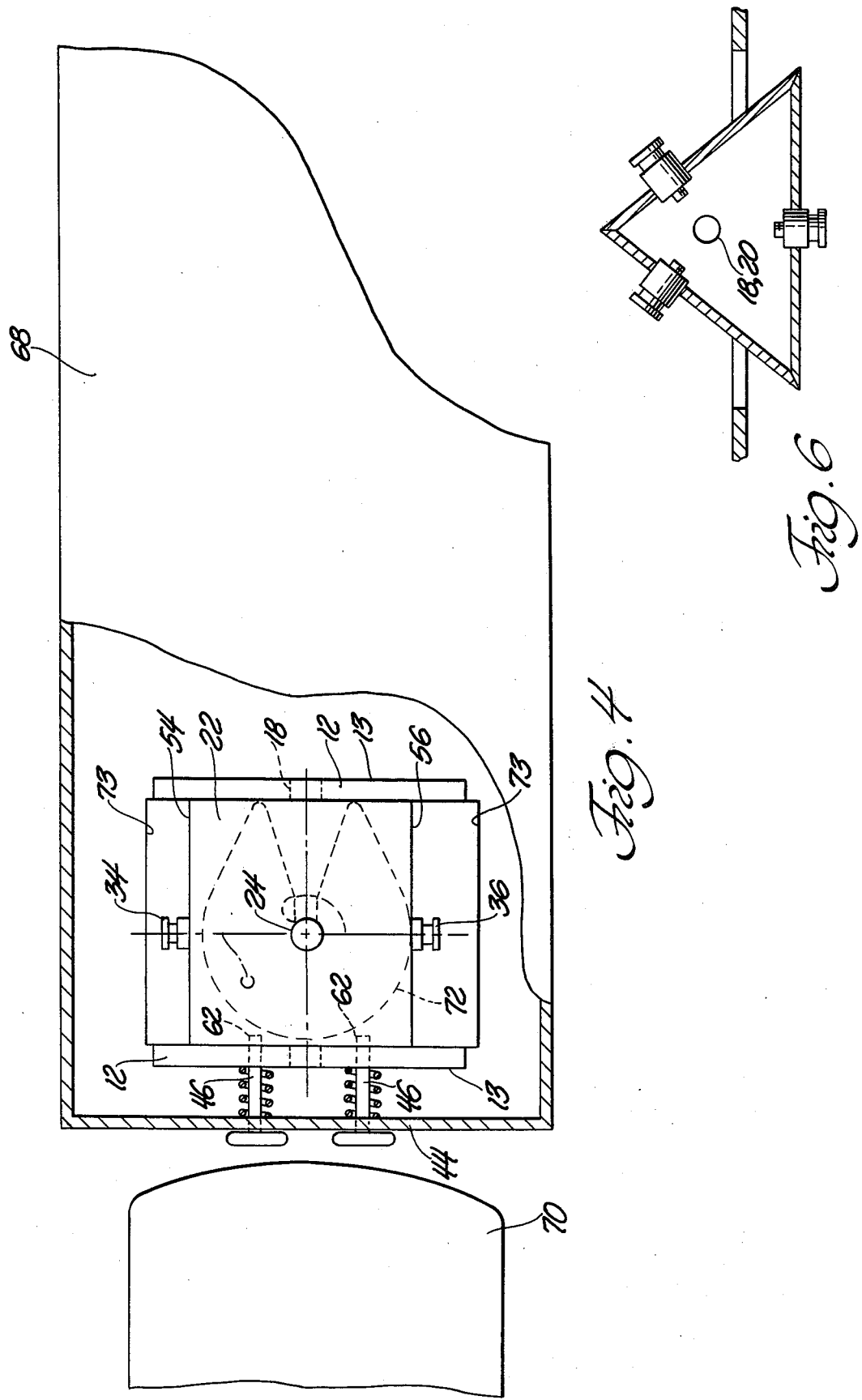

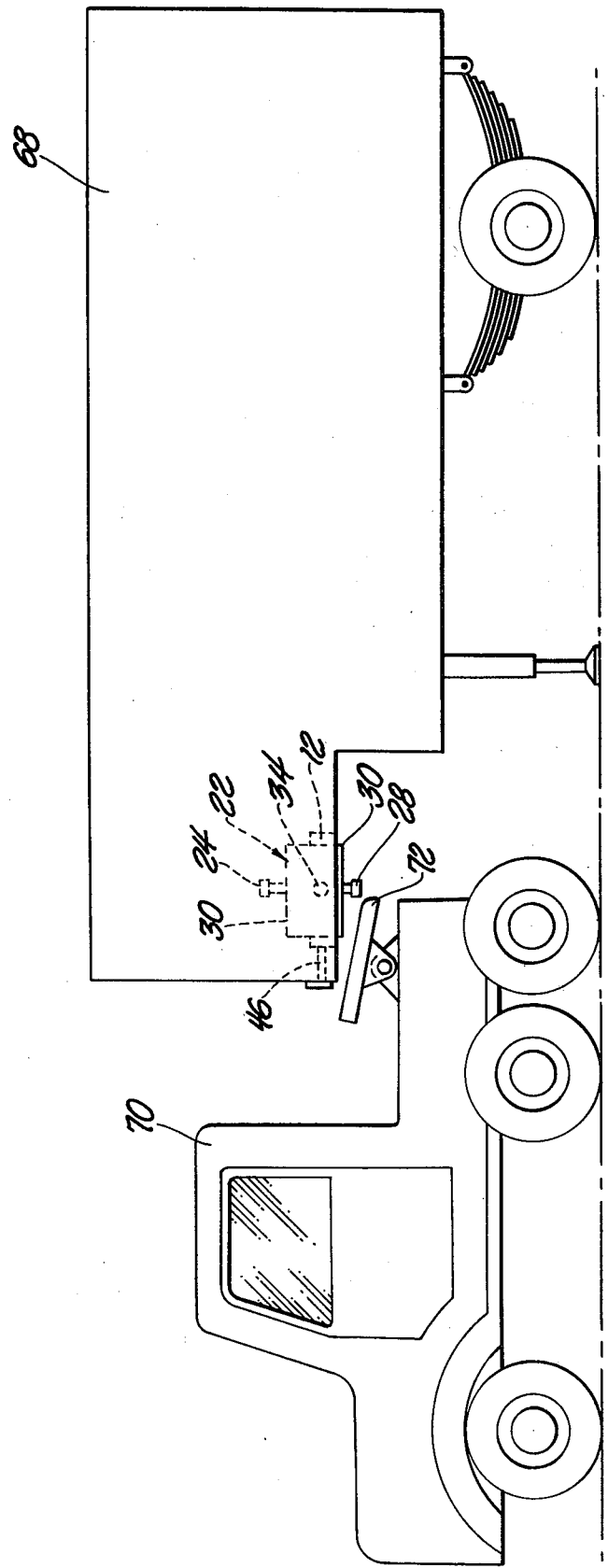

REVERSIBLE KINGPIN FOR TRAILERS

GOVERNMENT INTEREST

The invention described herein may be manufactured, used and licensed by or for the Government for governmental purposes without payment to me of any royalty thereon.

BACKGROUND AND SUMMARY OF THE INVENTION

Trailers are often called upon to transport hazardous materials, such as flamable liquids, gasoline, pesticide, strong acids and alkalines, poisonous liquids or perishable goods such as milk or other perishable refrigerated substances. At present, draft vehicles must be specially made in order to accommodate trailers, since the fifth wheel height of the draft vehicle must be the same as the kingpin height of the trailer if they are to be used together. In an effort to allow any draft vehicle with sufficient power to be used with a trailer with different fifth wheel height, various attempts have been made to equip draft vehicles with adjustable fifth wheel heights. Two such attempts are Van Langen U.S. Pat. No. 2,515,575 and Gurton et al U.S. Pat. No. 2,590,962. Both are examples of vehicles with hydraulically adjustable fifth wheels. Each of the patents cited above are designed to do different function than the present invention and differ from each other as well. Van Langen uses a tiltably mounted fifth wheel adjusted by a hydraulic cylinder piston rod. When fluid is pumped into the front of the cylinder, the fifth wheel is raised until its movement is halted by a bell crank arrangement. The drawback to the Van Langen invention is that while such a vehicle so equipped may fit any trailer skid plate height, it cannot haul the vehicle for any considerable distance. It is designed merely to raise and lower the trailer so that on inclined areas, the fifth wheel height can be adjusted so that when lifting the trailer, the trailer remains level. It is limited as a long range moving device because of the fore and aft forces associated with draft vehicle-trailer motion. Upon examination of the Van Langen device it can be seen that while Van Langen did contemplate long range hauling, he did not contemplate such hauling in the elevated position because, owing to the construction of the Van Langen device, the strain associated with forward or backward movement would cause undue wear and strain upon the hydraulic shift means. In order for the Van Langen device to haul trailers for long distance, the fifth wheel is first raised to the desired height, and when the draft vehicle and trailer were properly connected, the fifth wheel is lowered to its normal position for enabling the entire assembly to be transported. Thus it can be seen that at times the trailer draft vehicle side view would appear as an angle less than the desired 180° norm. Such an arrangement would make driving different and likely more dangerous than a driver would normally expect. Indeed, in military situations, with four different fifth wheel heights, the driver would have to be accustomed to potentially many different tractor trailer arrangements. The present invention avoids such shortcomings by providing a trailer which is equipped to accommodate any of several different draft vehicles. By adjusting the trailer skid pad, the trailer can be towed by any sufficiently powered draft vehicle without altering the horizontal profile from the desired 180° norm and so eliminate the driving hazards associated with Van Langen. Also, Van Langen's use of hydraulic cylinder is expensive to install, control and maintain. The present invention's structure mode of adjustment, ease of adjustment and simplicity of construction contrast sharply with the expense and complexity associated with a hydraulic device.

Gurton et al U.S. Pat. No. 2,590,962 also uses hydraulic means to adjust to accommodate trailers with fifth wheel heights. Gurton et al is novel in that neither the draft vehicle or the trailer are altered in any way, rather a third vehicle, a detachable dolly trailer, is equipped hydraulically and is interposed between the trailer and the draft vehicle. In this manner, the dolly's fifth wheel is adjusted to the desired position. The dolly is attached to the draft vehicle and the entire arrangement is ready to travel any distance. Although an advancement over Van Langen U.S. Pat. No. 2,515,575, in that a trailer could be hauled over long distances by a draft vehicle of different fifth wheel height, the dolly in the adjusted position has some of the same disadvantages as Van Langen. Among these is the hydraulic system utilized in Gurton et al which is relatively expensive to install and maintain and is fairly complex in construction and design. In addition to the disadvantages cited above, Gurton et al contemplates the maintainence of an additional fleet of vehicles, namely the dollys. Many if not most companies today can ill afford to have business capital tied up in such equipment. The present invention is simple, inexpensive and can be used in most trailers, give some modifications. Thus, the present invention contributes to less dead heading and a quicker turn around time for any trailer so equipped when it reaches its destination. Finally, flexibility of the trailers in any given fleet is enhanced by each trailer being able to be used with any suitably powered draft vehicle, regardless of fifth wheel heights.

BRIEF DESCRIPTION OF THE DRAWINGS

FIG. 1 is a longitudinal cross-section of an adjustable skid plate assembly embodying my invention.

FIG. 1a is an end view of a pivotal support means used in the FIG. 1 assembly.

FIG. 2 is a longitudinal side view of the FIG. 1 skid plate assembly in a different rotated position from FIG. 1.

FIG. 3 is an end view of the adjustable skid plate assembly taken at right angles to FIG. 2.

FIG. 4 is a top view of a tractor-trailer broken away to show the skid plate assembly.

FIG. 5 is a longitudinal side view of a tractor-trailer utilizing my invention.

FIG. 6 is a fragmentary view illustrating another embodiment of my invention.

Turning now to the drawings, FIGS. 1 through 3 depict an adjustable skid plate assembly 22 comprising four interconnected skid plates 26, 30, 54 and 56. The entire assembly is designed to be hollow so as to minimize weight. The four skid plates are welded or otherwise secured to end walls or plates 58 and 60. Mounted upon the skid plates 26, 30, 54 and 56 are kingpins 24, 28, 34 and 36 respectfully. The entire assembly is suspended by pivotal support means 12 which includes stationary bearings 16 mounted in transverse channels 13 for rotary engagement with stub shafts 18 and 20 carried by walls 58 and 60. Shafts 18 and 20 define a pivot axis A that is parallel to the trailer longtudinal axis. It should be noted that any means pivotally supportive of the assembly may be utilized in place of the stub shafts shown. Floor 10 of the trailer must be equipped with an enlarged rectangular opening 73 to permit swinging movement of the skid plate assembly around axis A. The kingpins 24, 28, 34, and 36 are arranged upon the various skid plates such that the kingpin axes B and C intersect the axis A formed by the two stub shafts. This is important, as such a construction allows all the kingpins to occupy the same vertical line when in the operative position. Each skid plate 26, 30, 54 and 56 is located a different distance from pivot axis A so that a different clearance space 32 is obtained by each skid plate when it is in its operative position mated to the tractor fifth wheel.

Upon rotation of the skid plate assembly, a different skid plate is presented in the operative position. Thus, in the position depicted in FIG. 1, skid plate 26 acts as the operative skid plate; clearance space 32 as measured from trailer floor 10 to skid plate 26 is relatively great. Upon rotation of the assembly to the FIG. 2 position skid plate 30 becomes operative; clearance space 32 is then relatively small. With the embodiment shown in FIGS. 1 through 3 four different kingpin heights are obtainable, depending on the rotated position of the skid plate assembly.

The entire skid plate assembly is oriented so that its pivot axis A is parallel to the trailer longitudinal axis so as to minimize unwanted rotation and stress problems associated with fore and aft forces which arise when the draft vehicle-trailer arrangement accelerates and decelerates.

Redundant latch devices 46 may be suitably mounted in the trailer for selective insertion into any two of four keeper openings 62 in end wall 58 of the skid plate assembly to hold said assembly in any of its four adjusted positions. It will be appreciated that the four keeper openings 62 are concentrically spaced around axis A to permit a given latch device 46 to enter into any selected keeper opening. The specific latch device is not part of my invention. Rather, it is mentioned for use in those circumstances where deemed necessary.

This invention was envisioned especially for use in military trailers to permit the selective mating of a given trailer to any of several different size tractors, either to meet emergency situations or as a normal mode of operations. At present trailers and tractors in the U.S. military fleet have at least four different fifth wheel heights measured from ground level to the skid plate lower face, namely 48 inch, 50 inch, 54½ inch and 64 inch. By equipping a given trailer with a skid plate assembly of the type shown in FIG. 1 it may be possible to adapt that particular trailer for towage by any of several different existing tractors in the fleet.

FIGS. 1 through 3 show a rectangular skid plate assembly that provides four different skid plate heights. The invention may be embodied in a triangular skid plate assembly to provide three different skid plate heights, as shown in FIG. 6. Alternately the invention may be embodied in a reversible rectangular assembly that provides only two skid plate heights, as for example by omitting kingpins 34 and 36 in the assembly of FIGS. 1 through 3.

The rotational skid plate assembly should be made as light as possible to permit easiest manual adjustment from one setting to another. Counterbalancing weights can be incorporated into the assembly to counteract weight imbalances due to the eccentricity of pivot axis A. For example, in the arrangement of FIGS. 1 through 3 the skid plate 26 located furthest from axis A can be formed of relatively light gage material, whereas skid plate 30 located closest to axis A can be formed of heavier gage material. Plates 54 and 56 can be of intermediate gage. With a counterbalanced skid plate assembly the task of manually turning the assembly from one setting to another should be relatively easy in spite of the skid plate assembly weight. Counterbalancing may avoid the necessity for latches 46. A non-latched structure would operate on the road in essentially the same fashion as the rockable structure shown in U.S. Pat. No. 2,293,560 to A. J. Anderson.

I wish it to be understood that I do not desire to be limited to the exact details of construction shown and described for obvious modifications will occur to a person skilled in the art.

I claim:

1. In a trailer having ground wheels and a skid plate assembly at its forward end for interraction with a fifth wheel on a towing vehicle, the improvement comprising a novel adjustable skid plate assembly which permits any given trailer so equipped to be towed by sufficiently powered vehicle tractors having different fifth wheel heights measured from ground level; said skid plate assembly comprising at least two individual skid plates rigidly interconnected to form a unitary structure, a kingpin projecting from each skid plate for interraction with the aforementioned fifth wheel when the respective skid plate is mated to the support surface of the fifth wheel; pivot means on the front end of the trailer for rotating the skid plate assembly around a horizontal rotational axis so that the various skid plates and associated kingpins can be sequentially moved into operative positions supportable upon the fifth wheel carried by the aforementioned tractor; the several skid plates being spaced different distances from the pivot means rotational axis so that each skid plate is at a different distance above ground level when in its operative position mated to the tractor fifth wheel.

2. The adjustable skid plate assembly of claim 1 wherein the axis of each kingpin intersects the pivot means rotational axis so that each kingpin is located on the same vertical axis when it is in its operative position.

3. The adjustable skid plate assembly of claim 1 wherein said pivot means rotational axis extends parallel to the trailer longitudinal axis.

4. The skid plate assembly of claim 1 wherein each skid plate is of a different thickness to provide for a counterbalance feature to prevent unwanted rotation of the skid plate assembly from its adjusted position; said counterbalanced assembly having its center of mass substantially coincident with the rotational axis of the pivot means in any adjusted position of the skid plate assembly.

5. The skid plate assembly of claim 1, wherein the aforementioned pivot means is attached to a trailer floor by any suitable means and oriented so that the pivot means axis is parallel to the trailer longitudinal axis and such that the skid plate assembly extends through clearance opening in the trailer floor; said clearance opening being of such dimensions as to allow the free, unhindered rotation of the skid plate assembly around the pivot means axis, said clearance opening being located in the fore section of trailer so that it overlies the fifth wheel of a vehicle tractor when the trailer is engaged to a vehicle tractor.

6. The adjustable skid plate assembly of claim 1 and further comprising latch means operatively mounted to lock the skid plate assembly in its several adjusted positions; said latch means being located such that it will not interfere with the rotation of the skid plate assembly.

7. The adjustable skid plate assembly of claim 6 wherein the said assembly is equipped with engagement means at predetermined locations along the surface of the assembly such that the latch means may engage said engagement means and lock the entire assembly in it's adjusted positions.

8. The adjustable skid plate assembly of claim 1 wherein said assembly is comprised of four skid plates with a kingpin associated with each skid plate; said skid plates being different distances away from the pivot means axis to provide the trailer with different fifth wheel vehicle heights.

9. A novel adjustable skid plate assembly which permits any given trailer so equipped to be towed by any sufficiently powered vehicle tractor irrespective of its fifth wheel height; said skid plate assembly comprising:

(a) a plurality of at least two individual skid plates rigidly interconnected to form a unitary structure;
(b) a kingpin projecting from each skid plate for interaction with an aforesaid fifth wheel when the respective skid plate is mated thereto;
(c) pivot means upon which said skid plate assembly is eccentrically mounted for rotation about a pivot means axis whereby the various skid plates and associated kingpins can be sequentially moved into operative positions supportable upon respectively different height fifth wheels; and
(d) means to prevent unwanted rotation of the skid plate assembly from any respectively selected adjusted position.

* * * * *